(No Model.)
W. CRONK.
HAND RAKE.
No. 509,999. Patented Dec. 5, 1893.
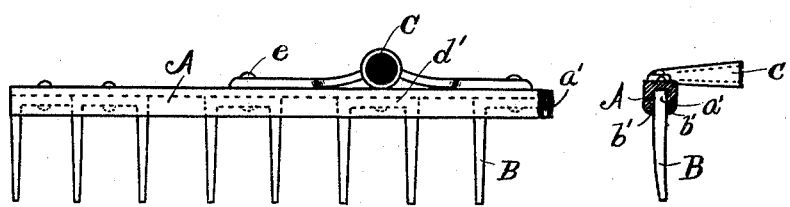
Fig. 1.      Fig. 2.
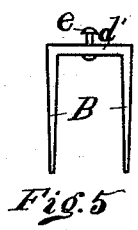 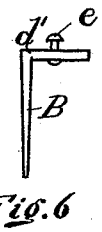 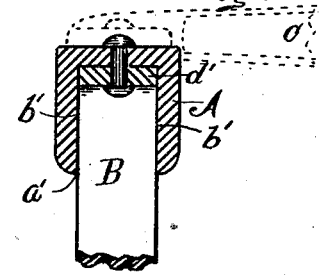
Fig. 5.      Fig. 6.      Fig. 3.
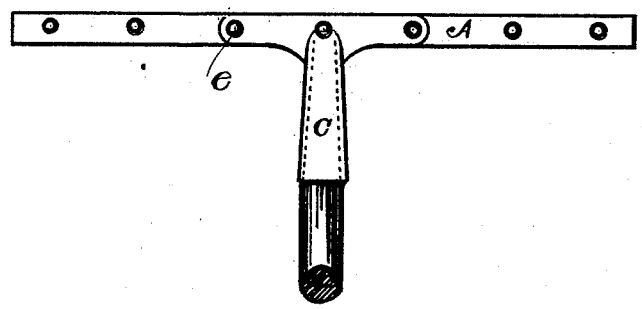
Fig. 4.
Witnesses
Edward G. Cronk.
W. D. Bowlby
Inventor
William Cronk
By his Attorney
E. Norton

UNITED STATES PATENT OFFICE.

WILLIAM CRONK, OF HAVANA, NEW YORK.

HAND-RAKE.

SPECIFICATION forming part of Letters Patent No. 509,999, dated December 5, 1893.

Application filed November 15, 1892. Serial No. 452,080. (No model.)

*To all whom it may concern:*

Be it known that I, WILLIAM CRONK, a citizen of the United States, residing at Havana, in the county of Schuyler and State of New York, have invented certain new and useful Improvements in Hand-Rakes, of which the following, with reference to the accompanying drawings, is a full, clear, and exact description.

My invention has for its object to provide a rake in a new form for manufacture, combining the essential qualities of strength, durability, and cheapness and being interchangeable in its parts for ready insertion in case of breakage.

The invention consists in forming the rake head of a metal plate with its opposite longitudinal edges upturned to form a longitudinal groove with vertically parallel side walls, throughout the rake head, teeth bent transversely and inserted in said groove, and retained by a small bolt or rivet in conjunction with said walls of the rake head.

In referring to the accompanying drawings similar letters of reference indicate like parts in all the figures.

Figure 1, is a rear longitudinal elevation of the rake. Fig. 2 is a cross elevation of the same. Fig. 3 is an enlarged cross sectional elevation of same. Fig. 4 is a plan view of the rake. Figs. 5 and 6 show the double and single teeth as adapted to fit and rivet in the groove of the rakehead.

The rake head A. may be either a casting of metal with groove $a'$ cast longitudinally through it opening downward, or a metal plate having its opposite longitudinal edges upturned toward each other forming said groove between, with vertically arranged parallel walls $b'$, serving to lap upon, and to retain the teeth B in line as they are impinged between them, as they are inserted with their bridge or transverse part $d'$ to the bottom of the groove of the rake head. The rivets $e$ passing through said transverse portions of the teeth and the upper central part of the head plate rigidly affix the teeth therein, but removably for the insertion of new teeth by removing the rivet. The teeth are to be cast of suitable metal, or cut from metal plate and suitably bent to be seated in their grooves in the U or L shaped forms shown. The handle socket C is of T form and of ordinary construction, except the transverse part D which is fitted flatly to the top of the head plate, but extended thereon to receive through it three of the rivets which pass upward through the teeth, and plate head firmly uniting these parts of the rake.

Having thus fully described my invention, what I claim as new, and desire to secure by Letters Patent, is—

1. In a rake, the head constructed of a metal plate bent over to form a rectangular hollow head opening longitudinally from its under side and ends, transversely bent teeth inserted in said opening and secured to the bridge part, or upper wall of the head, substantially as described.

2. In a rake, the head constructed of a metal plate bent over to form a rectangular hollow head opening longitudinally from its under side and ends, the T socket extended thereon, transversely bent teeth inserted in the opening of the head and with the socket united to its bridge part, substantially as described.

WILLIAM CRONK.

Witnesses:
 EDWARD G. CRONK,
 W. D. BOWLBY.